United States Patent

[11] 3,549,043

| [72] | Inventor | Ralph D. Waite |
| | | Sellersville, Pa. |
| [21] | Appl. No. | 774,283 |
| [22] | Filed | Nov. 8, 1968 |
| [45] | Patented | Dec. 22, 1970 |
| [73] | Assignee | Ametek, Inc. |
| | | New York, N.Y. |
| | | a corporation of Delaware |

[54] GLASS LENS SEAL RING
2 Claims, 3 Drawing Figs.

[52] U.S. Cl. ..................................................... 220/82, 220/46
[51] Int. Cl. ....................................................... B65d 25/54, B65d 53/02
[50] Field of Search .......................................... 220/82, 82-A, 82.5, 46; 240/2.1, 90, 151

[56] References Cited
UNITED STATES PATENTS

| 785,116 | 3/1905 | Perry | 220/46X |
| 1,714,360 | 5/1929 | Golladay | 220/46 |
| 2,426,800 | 9/1947 | Triplett | 220/46X |
| 2,723,142 | 11/1955 | Stebbins | 220/46X |
| 2,849,597 | 8/1958 | Petree | 220/46X |
| 3,057,501 | 10/1962 | Kroenert | 215/40X |
| 3,331,528 | 7/1967 | Racek | 220/46X |

*Primary Examiner*—Raphael H. Schwartz
*Attorney*—Smythe and Moore

ABSTRACT: An integral closure window assembly for the open end of an instrument casing wherein a continuous unitary sealing rim of a plastic material is molded in place around the periphery of the glass lens defining the window. The glass lens is seated in an inner annular groove formed in the sealing rim, and the rim is provided with an external flange integral therewith for use in mounting the assembly to the open end of an instrument casing.

PATENTED DEC 22 1970  3,549,043

INVENTOR
RALPH D. WAITE
BY
Smythe & Moore
ATTORNEYS

GLASS LENS SEAL RING

The present invention relates to instrument casing assemblies and more particularly to a closure window or lens assembly for the open end of an instrument casing.

Electrical and mechanical instruments and a wide variety of gauges generally comprise an instrument casing in which the instrument mechanism is mounted. One end of the instrument casing is generally open in order to observe an indicating mechanism response to the instrument mechanism. A transparent plate or window is mounted over the open end of the casing to permit observation therethrough. The window is sealed to the casing to prevent the entry of foreign matter into the instrument mechanism. Various forms of sealing arrangements have been proposed to retain the window in the casing. While such sealing arrangements are generally very effective in preventing the entry of foreign matter, they are not simple in structure and accordingly can introduce problems and difficulty in the manufacture and assembly of the instruments. In order to obtain a tight seal, the window and the sealing structure must be accurately fitted together with great care. When the sealing structure comprises an assembly of gaskets or sealing rings, the assembly process may require great care so that the completed instrument assembly is effectively sealed against foreign matter. Thus, effectiveness of the sealing structure largely depends upon the care in which the casing is assembled and not upon the design and construction of the individual components which are fitted to the transparent window to form the seal.

One of the objects of the present invention is to provide an improved closure window assembly for an instrument casing.

Another of the objects of the present invention is to provide an integral window and sealing ring which may be readily assembled as a unit into the open end of an instrument casing.

A still further object of the present invention is to provide a closure assembly wherein a glass lens has a sealing ring molded in place about its periphery.

In one aspect of the present invention, the closure window assembly for an instrument casing may comprise a glass lens to define a window. A continuous unitary sealing rim of a semirigid plastic material is molded in place or in situ completely around the periphery of the glass lens and extends outwardly of both faces thereof. The peripheral edge of the glass lens may be seated in an inner annular groove formed in the rim, and there may be provided an external flange integral with the rim for use in mounting the closure assembly to the instrument casing.

Other objects, advantages, and features of the present invention will become apparent upon reference to the accompanying description and drawings which are merely exemplary.

In the drawings.

Proceeding next to the drawings wherein like reference symbols indicate the same parts throughout the various views, a specific embodiment of the present invention will be described in detail.

Figure 1:
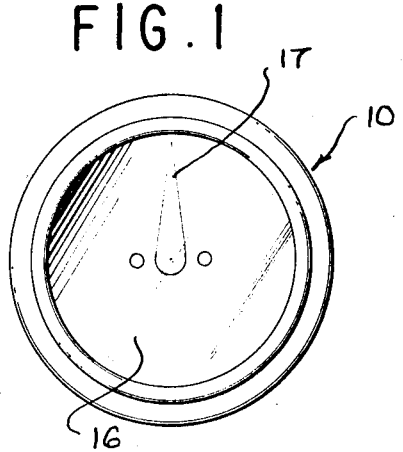
FIG. 1 is a plan view of the face of an instrument casing incorporating the closure assembly of the present invention.
Figure 2:
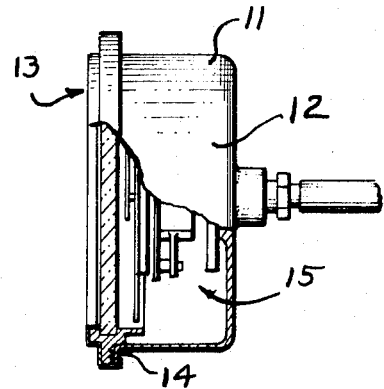
FIG. 2 is an elevational view of the instrument casing shown in FIG. 1 with a portion of the casing cut away to show the components thereof in greater clarity.

In FIGS. 1 and 2 there is illustrated an instrument indicated generally at 10 and comprising a casing 11 having a closed end 12 and an open end 13 surrounded by an external flange 14. A suitable instrument mechanism indicated at 15 is mounted within the casing and is provided with a dial face 16 upon which are applied indicating indicia which are traversed by an indicating pointer 17 responsive to the mechanism 15.

The open end 13 of the instrument casing is closed by a closure assembly comprising a transparent glass or window 18 and a sealing ring 19. The inner face of sealing ring 19 is provided with an annular groove 20 in which is closely seated the peripheral edge 21 of the glass window. The sealing ring further comprises a rearward extension 22 and a forward extension 23 which extend outwardly of the respective faces of the glass window. The ring is formed with an integral external annular flange 24 having a series of concentric grooves 25 in and providing spaced annular ribs 25' in the rearward face thereof.

The sealing ring is formed of a synthetic plastic material such as black polypropylene plastic or equivalent. One plastic found to be satisfactory is "Escon," a trademark of Enjay Chemical Company for its polypropylene. The ring is molded in place around the periphery of the glass plate, using the glass plate as an insert in the mold. The plastic sealing ring is semirigid and cannot be removed after being molded about the glass window. The glass window is immovably retained within the groove of the sealing ring.

Figure 3:
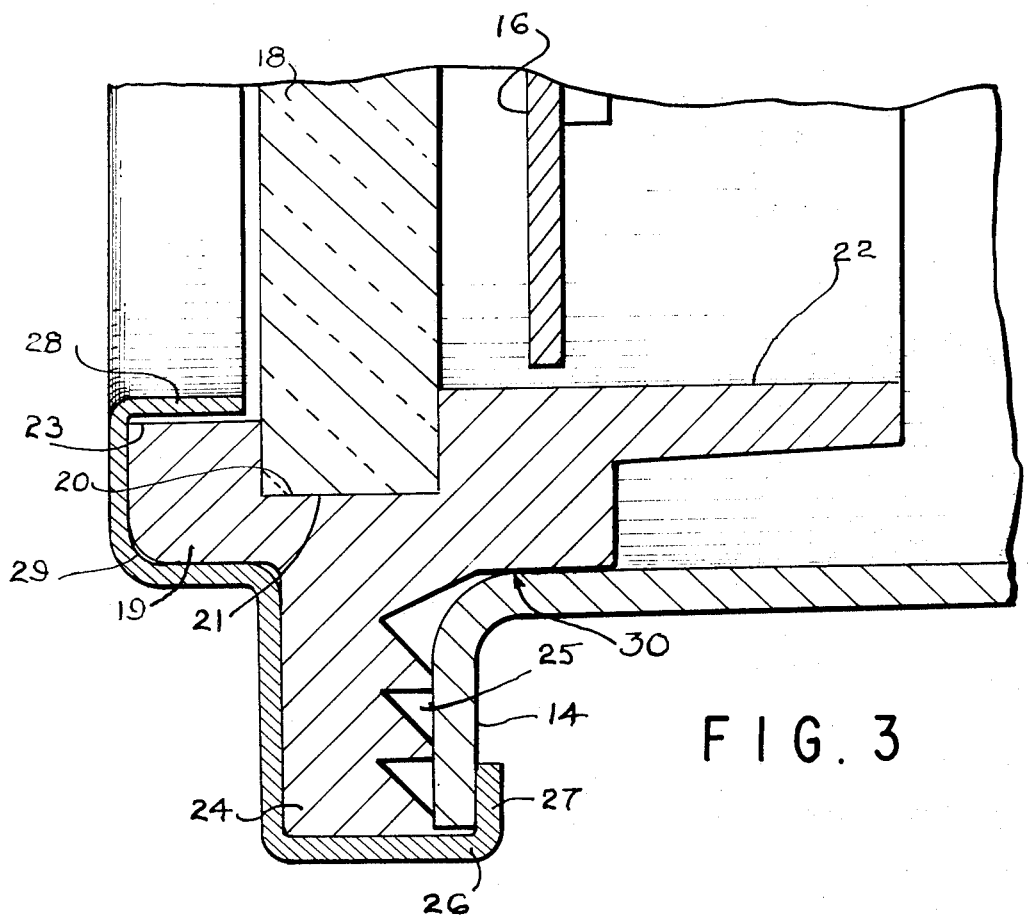
FIG. 3 is an enlarged sectional view of the lower portion of the front end of the instrument casing of FIG. 2.

In the assembly of an instrument casing incorporating the closure assembly of the present invention, the closure assembly is positioned against the flange 14 of the casing so that the ribs 25' engage the forward face of this flange to provide a seal therebetween. Cover ring 26 is bent beyond the casing flange at 27 and then bent inwardly over the forward portion of the sealing ring at 28. It is preferable that the cover ring 26 exert an inward pressure against the sealing ring in the general annular area indicated at 29 so as to urge the forward extension 23 of the sealing ring into closer contact against the glass window 18. Also, preferably, inward pressure should be exerted in the area 30 (FIG. 3) against the sealing ring, as a result of the inward pressure at areas 29 and 30, the glass will be tightly gripped and a seal will be effected. Thus, the casing assembly process comprises merely the step of placing the closure window assembly against the open end of the instrument casing and then placing the cover ring over the casing flange and closure assembly. The cover ring also urges the external flange of the sealing ring against the casing flange so that the ribs provide an effective seal therebetween against the entry of foreign matter.

Once the glass window has been sealingly positioned in the sealing ring, it is a relatively easy matter to obtain a sealing engagement between the sealing ring and the instrument casing. In the present embodiment of the invention, this has been done by a cover ring, but other structures which are known in the art could also be used.

Thus, it can be seen that the present invention provides a unitary closure window assembly for instrument casings, gauges or horological instruments and the like. The closure window assembly disclosed herein considerably facilitates and speeds up the process of assembling the instrument casing. The in situ molding of the sealing rim or ring around the periphery of the glass window eliminates the problems of trying to achieve a sealing engagement between the window and the sealing ring during the instrument assembly process. While the closure window assembly disclosed herein is intended for mounting on the open end of an instrument casing, it is readily apparent that this unitary structure may be used in a wide range of applications where it is desired to mount a transparent or translucent member in a structure.

I claim:

1. In combination with an instrument casing having a flared open end of a glass lens sealing ring assembly comprising a continuous unitary sealing rim of semirigid molded plastic material, said rim having an inner annular groove, a lens arranged in said groove and moldably bonded thereto for immovable anchoring therein and to constitute a unitary structure therewith, a reduced annular flange on said rim, relatively wide and deep concentric grooves in the bottom face of said flange providing spaced annular ribs engageable with the flared open end of said casing, and cover ring means interfitting said sealing ring and said flared end whereby said ribs engage said flared end and effect a seal thereat.

2. The combination with an instrument casing having a flared open end according to claim 1 wherein said cover ring closely interfits said sealing rim and engages the outer end thereof and the flared end of the casing, said cover ring exerting inward pressures against said sealing rim in the annular areas thereof adjacent said inner annular groove whereby said rim presses inwardly against and tightly embraces said lens.